(12) United States Patent
Cherian et al.

(10) Patent No.: US 8,374,604 B2
(45) Date of Patent: Feb. 12, 2013

(54) SYSTEM AND METHODS FOR PERFORMING MULTIPLE REGISTRATIONS ACROSS DIFFERENT RADIO ACCESS TECHNOLOGIES

(75) Inventors: George Cherian, San Diego, CA (US); Jun Wang, La Jolla, CA (US); Srinivasan Balasubramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 12/783,878

(22) Filed: May 20, 2010

(65) Prior Publication Data

US 2010/0323696 A1 Dec. 23, 2010

Related U.S. Application Data

(60) Provisional application No. 61/181,143, filed on May 26, 2009.

(51) Int. Cl.
*H04W 4/00* (2009.01)

(52) U.S. Cl. ........................ 455/435.2; 370/331; 455/436

(58) Field of Classification Search .......... 370/331–332, 370/328, 338, 349, 401, 395.21, 395.52; 455/435.2, 412.2, 414.1, 415, 413, 445, 466, 455/457, 421

See application file for complete search history.

(56) References Cited

U.S. PATENT DOCUMENTS

| | | | |
|---|---|---|---|
| 2001/0046223 A1* | 11/2001 | Malki et al. | 370/338 |
| 2004/0008689 A1* | 1/2004 | Westphal et al. | 370/395.21 |
| 2006/0018296 A1* | 1/2006 | Muraoka et al. | 370/338 |
| 2008/0089293 A1* | 4/2008 | Madour et al. | 370/331 |
| 2010/0054207 A1* | 3/2010 | Gupta et al. | 370/331 |
| 2012/0051328 A1* | 3/2012 | Swaminathan | 370/332 |

FOREIGN PATENT DOCUMENTS

| | | |
|---|---|---|
| EP | 2007161 A1 | 12/2008 |
| WO | WO2009036993 A1 | 3/2009 |

OTHER PUBLICATIONS

3GPP: "TR36.938 v1.0.0 Improved Network Controlled Mobility between E-UTRAN and 3GPP2/Mobile WiMAX Radio Technologies", 3GPP Technical Specification Group Radio Access Network,, [Online] vol. 36.938, No. V1.0.0, Oct. 1, 2007, pages 1-18, XP002486003, Retrieved from the Internet:URL:http://www.3gpp.org/ftp/Specs/html-info/36938.htm> [retrieved on Dec. 11, 2007].
International Search Report and Written Opinion-PCT/US2010/036258, International Search Authority—European Patent Office—Dec. 28, 2010.

(Continued)

*Primary Examiner* — Kamran Afshar
*Assistant Examiner* — Khalid Shaheed
(74) *Attorney, Agent, or Firm* — Darren M. Simon

(57) ABSTRACT

Disclosed are systems, methods and computer program products for performing multiple registrations across different radio access technologies (RATs). In one aspect, the registration procedure provisions a mobile device to register with a primary RAT and pre-register with at least one non-primary RAT using its air interface, which is different from the primary RAT. The pre-registration procedure includes setting up a radio session context and a packet data network (PDN) context with the non-primary RAT. The procedure further includes setting up a pseudo-binding with an external PDN gateway and obtaining binding state information for the mobile device from the PDN gateway without transferring binding state from the primary RAT to the non-primary RAT. The binding state information may be added to the PDN context. The mobile device may then perform handoff from the primary RAN to non-primary RAN using the preset contexts.

28 Claims, 9 Drawing Sheets

OTHER PUBLICATIONS

Soliman Elevate Technologies N Montavont IT/Telecom Bretagne N Fikouras K Kuladinithi University of Bremen H: "Flow Bindings in Mobile IPv6 and Nemo Basic Support; draft-ietf-mext-flow-binding-00.txt", Flow Bindings in Mobile IPV6 and Nemo Basic Support; draft-IETF-mext-flow-binding-00.txt, Internet Engineering Task Force, IETF; Standardworkingdraft, Internet Society (ISOC) 4, Rue Des Falaises CH-1205 Geneva, Switzerland, vol. mext, May 16, 2008,XP015058488.

* cited by examiner

SYSTEM AND METHODS FOR PERFORMING MULTIPLE REGISTRATIONS ACROSS DIFFERENT RADIO ACCESS TECHNOLOGIES

CLAIM OF PRIORITY UNDER 35 U.S.C. §119

The present Application for patent claims priority to Provisional Application No. 61/181,143, entitled "A Method to Perform Multiple Registration(s) Across Different Access Technologies" filed May 26, 2009, and assigned to the assignee hereof and hereby expressly incorporated by reference herein.

BACKGROUND

1. Field

This disclosure relates generally to the field of communications and more specifically to the system and methods for performing multiple inter-technology registrations and handoffs across different radio access networks.

2. Background

Radio access networks (RANs) are widely deployed to provide voice, data and multimedia services to mobile devices. These networks typically differ from each other based on radio access technologies (RATs) they employ. Examples of commonly deployed radio access technologies include: code division multiple access (CDMA) used in CDMA2000 networks, such as 1x, HRPD and eHRPD, wideband CDMA used in the universal mobile telecommunication system (UMTS) networks, time division multiple access (TDMA) used in Global System for Mobile communications (GSM) networks, and frequency division multiple access (FDMA) used in 3rd Generation Partnership Project (3GPP) Long Term Evolution (LTE) networks. Different RATs usually employ different signal modulation and coding schemes and different communication protocols, they operate in different frequency bands and provide different quality of service (QoS).

Due to the large variety of RANs currently deployed worldwide, popularity of multimode mobile devices capable of supporting multiple RATs has grown significantly. These multimode mobile devices may have one or more radios for communication with multiple RATs. During operation, a multimode device typically searches and registers with an available RAN. The technology with which mobile device currently registered called primary RAT. The device may then periodically search for more-preferred RANs and register with those networks as well in order to subsequently handoff to one of those networks. These technologies are called non-primary RATs. However, due to network differences, performing inter-technology registrations and handoff between a primary and a non-primary RAT are resource intensive and inefficient processes. Accordingly, there is a need to improve registration and inter-technology handoff across different RATs.

SUMMARY

To address these and other limitations of prior art, disclosed herein are system, methods and computer program products for performing registration and inter-technology handoff across different radio access networks. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a registration procedure provisions a mobile device to register with a primary RAT and pre-register with at least one non-primary RAT different from the primary RAT. Primary RAT is a technology which mobile device uses to transmit/receive its packet data network traffic. Non-primary RAT is a technology that mobile device considers switching to transmit/receive its packet data network traffic. The pre-registration procedure includes setting up a radio session context and a packet data network (PDN) context with the non-primary RAT without binding the non-primary RAT with the mobility anchor in the packet data network. The procedure further includes setting up a pseudo-binding with an external PDN gateway and obtaining binding state information for the mobile device from the PDN gateway without transferring binding state from the primary RAT to the non-primary RAT. The binding state information may be added to the PDN context. The mobile device may then perform handoff from the primary RAT to non-primary RAT using the preset context(s).

In another aspect, a registration maintenance procedure provisions for the mobile device to update session context and the PDN context maintained on the non-primary RAT while mobile device is attached to the primary RAT without moving point of attachment of the mobile device to non-primary RAT. In one aspect, the registration maintenance procedure provisions for non-primary RAT to update the radio session context and the PDN context using QoS update information provided by the primary RAT. In another aspect, registration maintenance procedure allows the mobile device to set or reset registration expiration timer(s) on non-primary RAT(s). The timer(s) are used to terminate unused mobile device's pre-registrations on non-primary RAT(s), thereby improving system resource allocation on the non-primary RAT(s). The procedure also provisions for the mobile device to determine if a full, partial or no PDN context has been preset on the non-primary RAT, and which actions to take in each case during handoff.

It should be noted that the disclosed pre-registration procedures may be carried out by single and multi-radio mobile devices. In case of a single radio device, the device may temporarily tune-away from the primary RAT to directly pre-register with the non-primary RAT(s). In case of multi-radio mobile device, the device may use its radios to independently communicate with the primary RAT and each non-primary RAT. For example, one radio may be used to support data traffic with the primary RAT and another radio may be used to directly pre-register with the non-primary RAT(s).

The following description and the annexed drawings set forth in detail certain illustrative features of the one or more aspects of system, methods and computer program products for performing registration and inter-technology handoff across different radio access networks. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects or features of methodologies for inter-technology registration and handoff across different radio networks are now described with reference to the drawings. Some aspects or features will be presented in terms of systems that may include a number of radio access networks, multi-mode mobile devices, components, modules, and the like. It is to be understood and appreciated that the various systems may include additional devices, components, modules, etc. and/or may not include all of the devices, components, modules etc. discussed in connection with the figures. A combination of these approaches may also be used. Some aspects or features will be presented in terms of methods that include steps for performing certain actions by various system components mentioned above. It is to be understood and appreciated that various methods may include additional steps by these and other system components and/or may not include all of the steps. Furthermore, it is to be understood and appreciated that in the following description, for purposes of explanation, numerous specific details are set forth in order to provide a thorough understanding of one or more aspects. It may be evident, however, that such aspect(s) may be practiced without these specific details.

Figure 1:
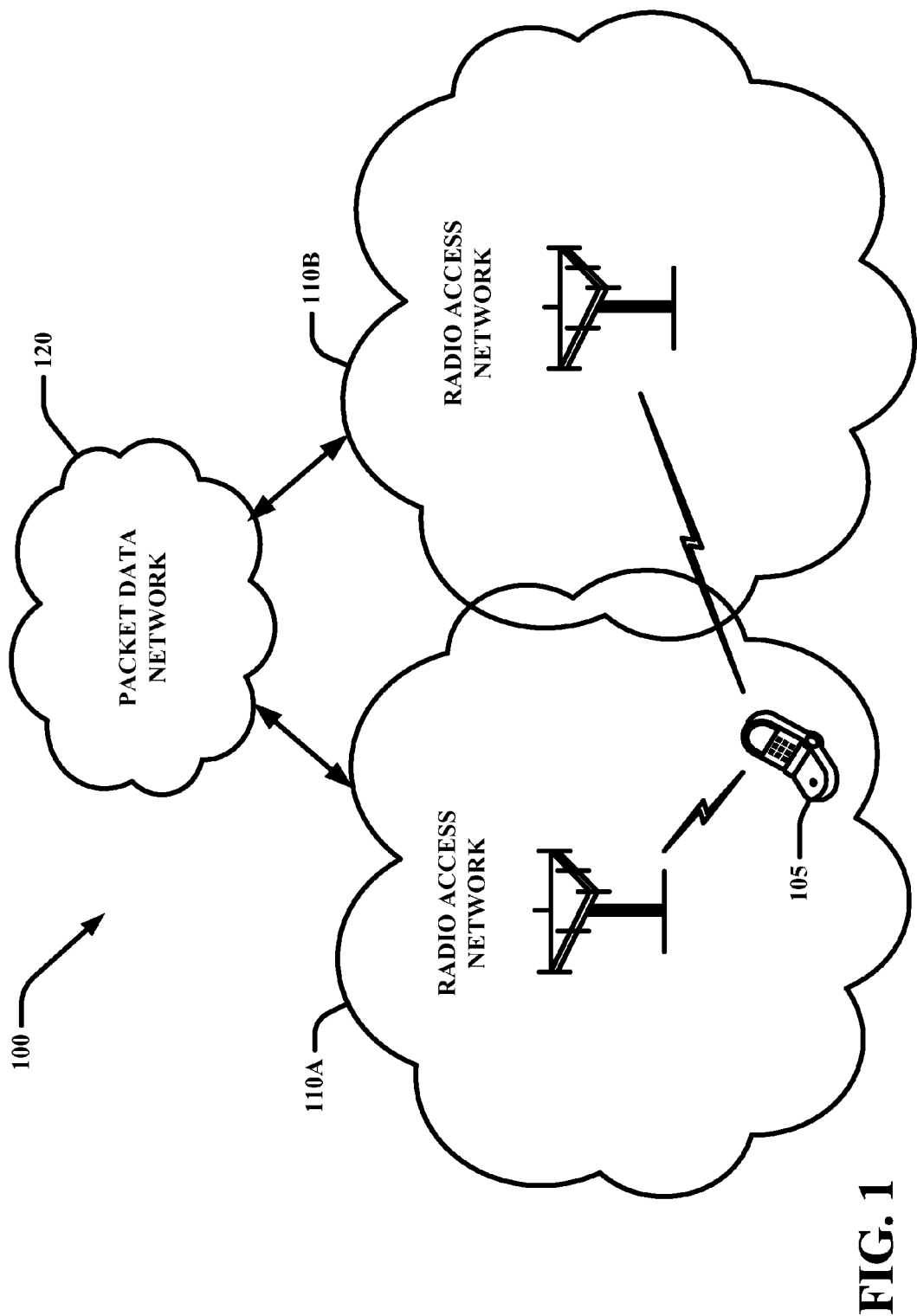
FIG. 1 is an illustration of a wireless communication system in accordance with one aspect set forth herein.

FIG. 1 illustrates one aspect of a wireless communication system 100 that includes one or more multimode mobile devices 105 capable of communicating with a plurality of different radio access networks (RANs) 110. The terms "networks" and "systems" are used interchangeably herein. RANs 110 provide to mobile devices 105 voice, data, multimedia and other services, as well as access to a core packet data network 120, such as Internet, or a core circuit-switched network, such as public switched telephone network (not shown). Mobile device 105 can include, but not limited to, a cellular telephone, a cordless telephone, a session initiation protocol (SIP) phone, a personal digital assistant (PDA), a handheld device having wireless connection capability, a laptop computer, or other portable processing device having a cellular or wireless modem. Mobile device 105 may also be referred to as a subscriber unit, subscriber station, mobile station, mobile, remote station, remote terminal, access terminal, user terminal, terminal, wireless communication device, user agent, user device, user equipment (UE) or the like.

In one aspect, RANs 110 may deploy different radio access technologies (RATs), which include but are not limited to, CDMA, TDMA, FDMA, OFDMA, SC-FDMA and other known or future technologies. For example, CDMA technology is implemented in Universal Terrestrial Radio Access (UTRA), CDMA2000 and other networks. UTRA includes Wideband-CDMA (W-CDMA) and other variants of CDMA. CDMA2000 includes 1xRTT, high rate packet data (HRPD), and evolved HRPD (eHRPD) technologies. TDMA technology is implemented in Global System for Mobile Communications (GSM). OFDMA technology is implemented in Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, radio access networks 110 may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Figure 2:
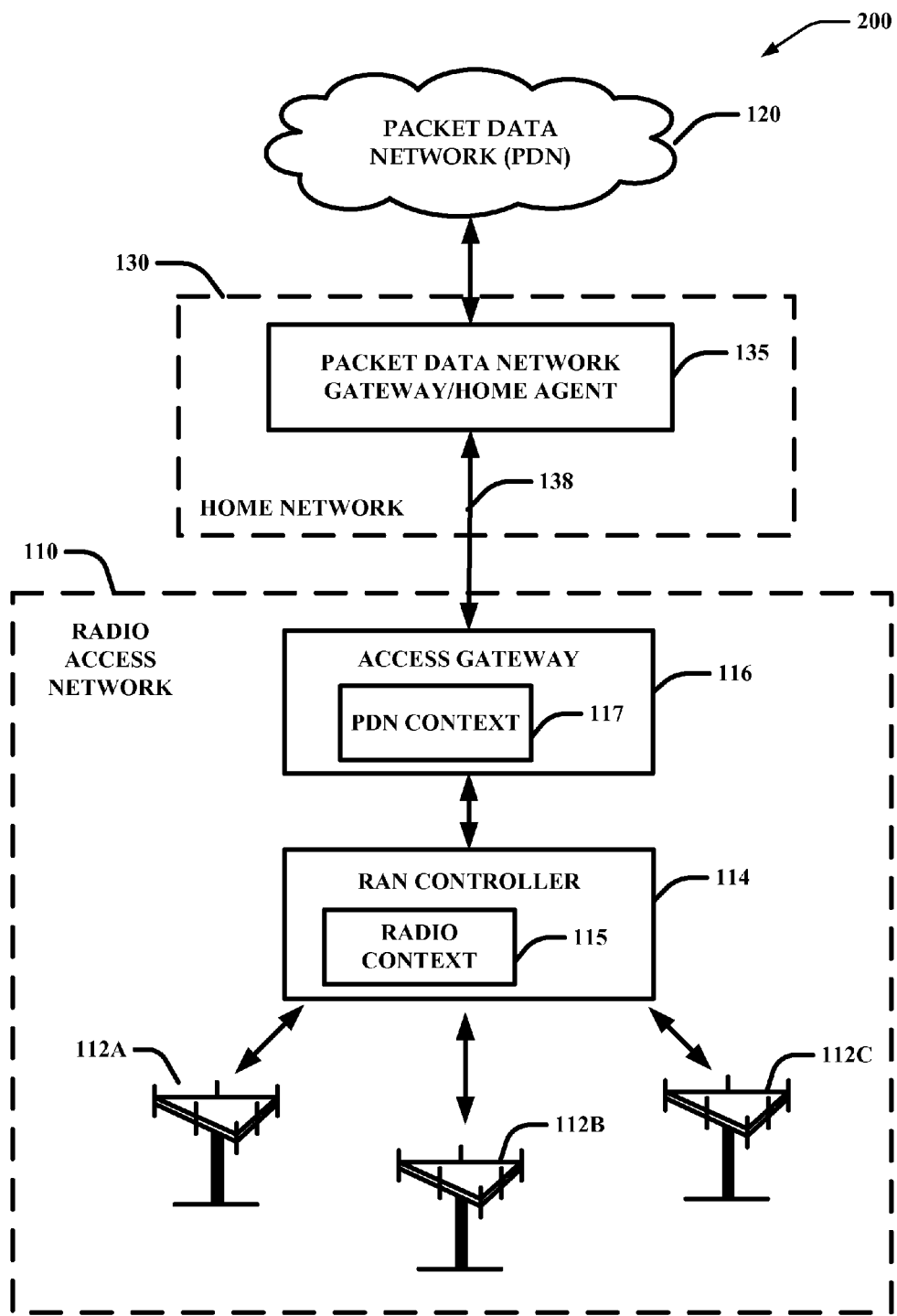
FIG. 2 is an illustration of a wireless communication system in accordance with another aspect.

FIG. 2 illustrates one aspect of a radio access network 110 in a communication system 200. The depicted high-level infrastructure of RAN 110 is merely exemplary and generic enough to represent both RAN 110A and 110B, which deploy different radio access technologies. More specifically, RAN 110 may include a plurality of radio base stations 112, a RAN controller 114, and an access gateway 116. RAN 110 may be divided into a plurality of cell (not shown). Each cell having one or more radio base stations 112. A group of one or more cells may have a dedicated RAN controller 114. Radio base stations 112 may include multiple antenna groups and/or a transmitter/receiver chain that can in turn comprise a plurality of components associated with radio signal transmission and reception (e.g., processors, modulators, multiplexers, antennas, etc. (not shown)) to and from the mobile devices, such as devices 105.

In one aspect, RAN controller 110 is network equipment providing establishment and termination of radio connections, as well management of radio sessions, resource allocation and mobility of mobile devices 105 to and from RAN 110. When entering the coverage area of RAN 110 for the first time, mobile device 105 listens for pilot synchronization signals from RAN controller 114, registers with the network 110 and establishes one or more radio link protocol (RLP) connections, also known as flows, with RAN controller 110. Different RLP flow may be created for different services provided by radio access network 110 including voice, data, multimedia and signaling services. In one aspect, controller 114 maintains one or more radio session contexts 115 for each mobile device 105 attached to RAN 110. Each context 115 stores mobile device's IP address, international mobile subscriber identity (IMSI) number, RLP flow information, quality of service (QoS) information and other radio session parameters. In one aspect, separate contexts may be created for different RLP connections with the mobile device.

RAN controller 110 also provides connectivity between mobile devices 115 and access gateway 116 via, for example, A10 data interface and A11 signaling interface. In one aspect, gateway 116 provides connectivity from mobile devices 105 attached to RAN 110 to external packet data network (PDN) 120, such as the Internet, by being the point of exit and entry of all packet data traffic for RAN 110. In that function, gateway 116 may provide authentication, authorization and accounting (AAA) services for data traffic entering/exiting RAN 110, point-to-point protocol (PPP) connections to external network devices, IPv4 and IPv6 address allocation and management for mobile devices 105, quality of service (QoS) support for various data traffic to/from mobile devices 105, including policy enforcement and packet filtering for different QoS reservations, and other services. To that end, gateway 116 may maintain one or more PDN contexts 117 that contain parameters for various services provided to mobile devices 105, including, but not limited to PPP session parameters, AAA parameters, QoS reservation parameters, IP session parameters, data link session parameters and other types of information.

In one aspect, access gateway 116 may be implemented as a packet data serving node (PDSN) that provides mobile IPv4 and IPv6 packet transport for signaling and data transmission/reception to/from mobile devices 105 according to mobile IP and/or proxy mobile IP (PMIP) standards. If RAN 110 is in the home network of attached mobile devices 105, access gateway 116 provides connection to the mobile devices' home agents (HA) located in the home network. For example, external packet data network (PDN) gateway 135 in the device's home network 130 may function as a local mobility agent/home agent. For the purpose of this disclosure HA also includes a local mobility anchor (LMA). HA is the topological anchor point for the mobile device's home network IP address prefix(es) and is the entity that manages the mobile device's binding state, which allows mobile device to move between networks without changing device's home addresses (HoAs). Binding is the association of the mobile device's HoA in a home network with its care-of-address (CoA) in a foreign network. IP address binding allows IP packets to be routed to the mobile device regardless of the mobile device's point of attachment in a foreign network.

In another aspect, if RAN 110 is in the foreign network for the attached mobile devices 105, access gateway 116 may function as proxy agent for these mobile devices. In that capacity, when mobile device 105 registers with RAN 110, access gateway 116 identifies HA of mobile device 105 using binding state information associated with the device's home address. As indicated above, external PDN gateway 135 in the device's home network 130 may function as its home agent. Gateway 116 then creates a bidirectional tunnel 138 with device's HA 135, encapsulates the received packet in a new packet with access gateway's source address as a care-of-address (CoA), and transmits the encapsulated packets through the tunnel 138 to home agent 135. When data packets are received through the tunnel 138 from HA 135, gateway 116 de-encapsulates them based on the binding state information associated with the HA 135 and forwards them through the appropriate bearer connection and RLP flow to mobile device 105.

In the event access gateway 116 implements PDSN functionality described above, access gateway 116 may store in PDN context 117 mobile IP or proxy mobile IP (PMIP) binding state information for each mobile device 10 attached to RAN 110. For example, binding state information stored in PDN context 117 may include, but is not limited to, mobile device's home agent address, list of HoA prefix(es) provided by home agent 135 to be assigned to mobile device 105 for transmission of various types of data traffic over PDN 120, bidirectional tunnel settings for transmission of data traffic between home agent 135 and mobile device 105, and other types of binding state information.

With reference to FIGS. 1 and 2, while mobile device 105 is located within the coverage area of RAN 110A, the device is attached to that network and all traffic to and from the device is usually handled by RAN 110A. In this case, RAN 110A becomes a primary RAT for the mobile device. When device 105 moves between cells of RAN 110A, the radio connection with the mobile device may be transferred among several base stations 112, or among several RAN controllers 114 of RAN 110A all of which employ the same radio access technology. This transfer of connection is called an intra-technology handoff. However, when mobile device 105 moves to the coverage area of RAN 110B, which deploys a different radio access technology, device 105 may register and handoff its connections to RAN 110B, while terminating all communication sessions with RAN 110A. This transfer of connection is called inter-technology handoff. After this handoff, RAN 110B becomes mobile device's primary RAT.

To enable inter-technology handoff from the source network to the target network, current wireless communication standards provide a pre-registration procedure which enables multimode mobile devices to pre-register with one or more detected target networks, also called non-primary RATs, without moving its binding (i.e., IP traffic) from the source network to the target network. Generally, these standards support pre-registration only when there is a tunnel in the network that connects the primary RAT and the non-primary RATs. This is called network-assisted pre-registration. However, these standards do not provide support for pre-registration when there is no tunnel between primary-RAT and non-primary-RATs. In other words, current wireless communication standards do not support direct device-initiated pre-registrations.

Accordingly, various direct pre-registrations procedures are disclosed herein. A pre-registration with non-primary RAT may be carried out by the mobile device in several different ways. If a mobile device 105 has multiple radios, these radios may be used to independently communicate with the primary RAT and non-primary RATs. For example, one radio may be used to support data traffic with a primary RAT and another radio may be used to directly pre-register with one or more non-primary RATs. If mobile device 105 has only one radio, the mobile device may temporary tune-away from the primary RAT to directly pre-register with the one or more non-primary RATs.

More specifically, to enable smooth and fast inter-technology handoff from source network 110A to target network(s) 110B, multimode mobile device 105 may directly pre-register with one or more detected target networks, also called non-primary RATs, using non-primary RAT's air interface and without moving its binding (i.e., IP traffic) from the source network to the target network. In one aspect, having pre-registered with one or more non-primary RATs, mobile device may continue to maintain its attachment to the primary RAT, and handoff to the target system only when, for example, mobile device 105 moves out of the area of coverage of the primary RAT and substantially into the coverage area of the non-primary RAT, so that strength of its radio signals become substantially greater than that of the primary RAT, or when the load of the primary RAT substantially exceeds the load of the non-primary RAT, so that primary RAT can no longer support the quality of service required by mobile device 105, and mobile device has to handoff to the non-primary RAT to continue communicating.

First methodology enables a mobile device to set up IP context on target system(s) without moving IP binding or proxy IP binding from primary RAT to non-primary RAT. Second methodology provides signaling support between access terminal and the non-primary RAT(s) indicating that the primary RAT is another RAT than the one the mobile device is currently using—"primary RAT" is the radio access technology that is currently used for data delivery. In other words, the mobile device is exchanging signaling with the non-primary RAT with the intention of pre-registration only, and not for actual attachment that requires IP binding transfer. Third methodology provides an air-interface support on the primary-RAT indicating a time-off to perform pre-registration with non-primary RAT(s). Fourth methodology provides timing mechanism(s) for the non-primary RAT indicating how long to maintain a registration with the mobile device. Firth methodology provides QoS maintenance for non-primary RAT(s) based on QoS setup/changes on the primary RAT.

Figure 3:
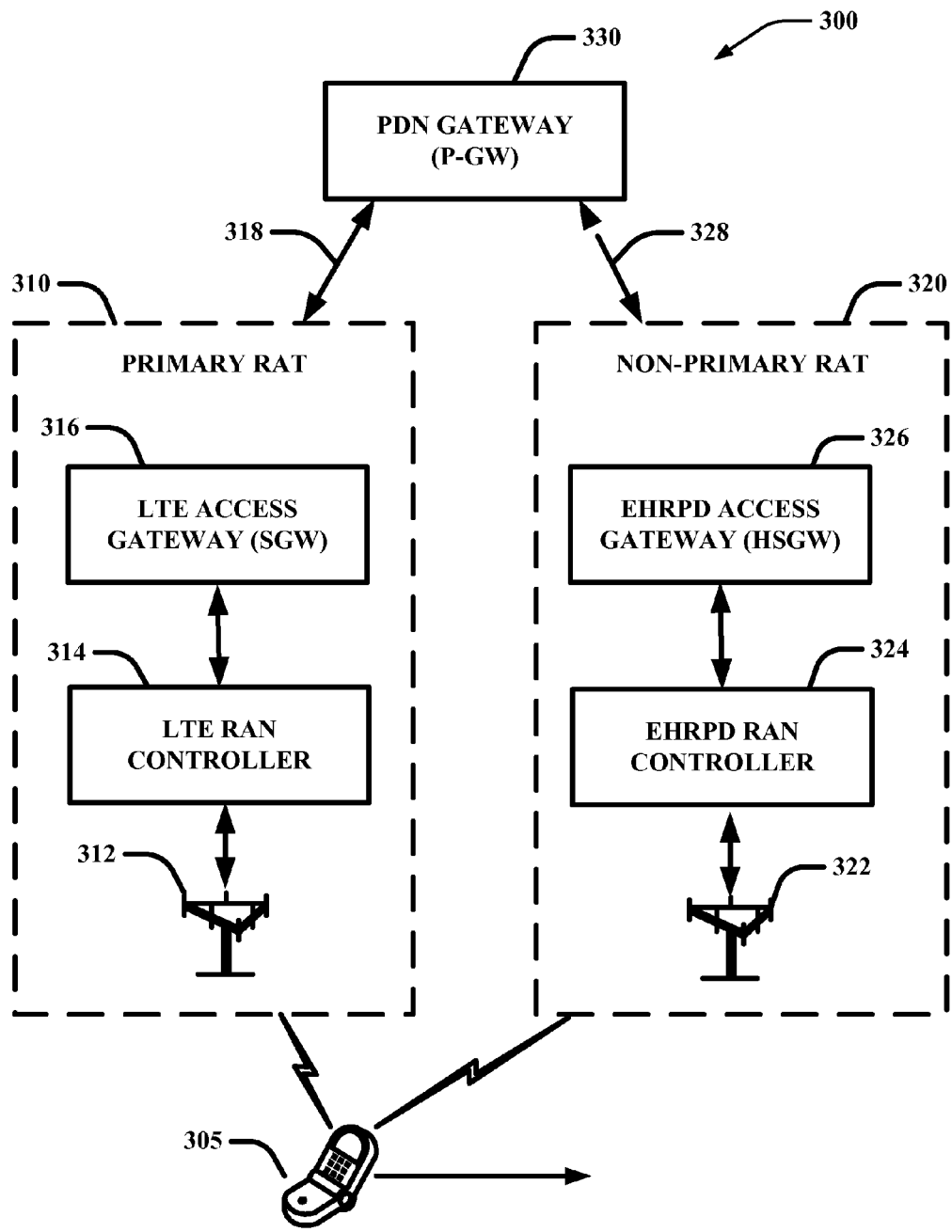
FIG. 3 is an illustration a wireless communication system in accordance with yet another aspect.

These and other methodologies will be described next with reference to FIG. 3, which depicts a communication system 300 comprising a multimode mobile device 305 capable of supporting LTE and eHRPD technologies. Mobile device 305 is attached to LTE network 310, which functions as its primary RAT. RAN 310 includes one or more radio base stations 312, RAN controller 314, and access gateway 316, which is also known as serving gateway (SGW). The SGW 316 is connected via a bidirectional tunnel 318 with PDN gateway 330 located in the home network of mobile device 305. SGW 316 functions as a proxy agent for mobile device 305, and PDN gateway 330 functions as home agent (HA) or local mobility anchor (LMA) for mobile device 305. System 300 further includes an eHRPD network 320, which is a non-primary RAT. eHRPD network 320 includes radio base stations 322, RAN controller 324, and access gateway 326, which is also known as HRPD serving gateway (HSGW). It should be noted that functionality of RAN controllers 314 and 324 and access gateways 316 and 326 of communication system 300 are substantially similar to the corresponding components of communication system 200 described above. It should be also noted that infrastructure of system 300 is merely exemplary and other radio access technologies may be used in other aspects.

In one aspect, pre-registration of mobile device 305 on the non-primary RAT, i.e., eHRPD RAN 320, may include setting up on network 320 radio session context(s), such as eHRPD context, and PDN context(s), which includes PPP session parameters, AAA/HSS parameters, QoS parameters, IP address binding parameters and other parameters. In one aspect, mobile device 305 may establish eHRPD radio session context with eHPRD network controller using standard eHRPD air interface signaling techniques known in the art. In another aspect, mobile device 305 may setup a PDN context via standard PDN connection over air-interface of RAN 320. However, in eHRPD, and most other current technologies, establishment by a mobile device of a PDN connection with a radio access network causes binding of the access gateway 326 to PDN gateway 330. This binding will immediately re-route all traffic from LTE gateway 316, which is still the primary RAT, to the eHRPD access gateway 326, which is intended to function as a non-primary RAT, although this re-routing was not authorized or intended by the mobile device. Accordingly, a method is needed to enable PDN connection procedure over non-primary-RAT air interface without switching binding of the primary RAT with non-primary RAT.

To address this need, in one aspect, access gateway 326 may perform a pseudo-binding 328 with PDN gateway 330 in response to PDN connection from mobile device 305. This pseudo-binding allows access gateway 326 to collect binding state information from PDN gateway 330 and setup PDN context(s) for mobile device 305 without actually triggering PDN gateway 326 to re-route data for mobile device 305 from its primary RAT 310 to non-primary RAT 320. To perform pseudo-binding, in one aspect, a new signaling flag could be a added to proxy binding update (PBU) and proxy binding acknowledgement (PBA) messages that are transmitted between HSGW 326 and P-GW 130. These messages are typically used to request/receive binding state information for the mobile device from its home network. The new signaling flag will indicate that HSGW 326 is associated with non-primary RAT, and the mobile device's current care-of address (CoA), which is associated with SGW 316, should not be changed at this time.

In another aspect, access gateway 326 does not need to request binding state information right away after receiving PDN signaling from mobile device 305. Instead, HSGW 326 may cache the PDN connection context and create binding with PDN gateway 330 using standard PBU/PBA messages when mobile device 305 actually performs handoff from source system 310 to target system 320. In one instance, access gateway 326 may obtain a portion of PDN context information from the mobile device. In another instance, gateway 326 may obtain another portion of PDN context information from AAA servers or home subscriber server (HSS). Yet in another instance, gateway 326 may obtain a portion of PDN context information from access gateway 316 using, for example, context transfer over S103 tunnel Accordingly, using these methodologies a mobile device may set up PDN context(s) on target system(s) without moving IP binding state (e.g., proxy mobile IP binding) from the primary RAT to non-primary RAT. The HSGW marks the context as the cached context, and hence until the an explicit inter-technology handoff is indicated to the HSGW, the HSGW will not initiate a binding with PDN gateway.

In another aspect, the context(s) that are "preset" on target systems (i.e., non-primary RATs) while the mobile device 305 is attached to the source system (i.e., primary LTE RAT 310) must be maintained as the mobile device moves around and its session and IP context(s) on the primary RAT change when, for example, old services are terminated and new services are added. Therefore, mobile device must periodically tune to target system(s) (e.g., non-primary eHRPD RAT 320) and perform signaling exchanges necessary for radio session and/or mobility management. However, current signaling mechanisms do not have the ability to indicate to the target network(s) that the primary-RAT is a different RAT than the one the mobile device is currently accessing. Currently, most signaling messages between mobile device and the target network (e.g., RAN 320) would result in the access network signaling to the access gateway (e.g., HSGW 326) that the mobile device is active on that access network. Hence the access gateway (e.g., HSGW 326) would initiate IP binding for that access system, making this system as the primary RAT, although this switch was not intended by the mobile device.

To address this problem, in one aspect, a new signaling may be introduced between the mobile device and the target network using air-interface and A-interface (IOS signaling) to signal between mobile device and access gateway. For example, in the case of eHRPD RAN 320, a new flag may be used in the Connection-Request message sent by mobile device 305 for the purpose of setting up the traffic channel to indicate that the traffic channel is preset for registration maintenance purpose. Based on the signaling between mobile device 305 and eHRPD access network 320, the RAN controller 324 signals to the HSGW 326 that the primary-RAT is not eHRPD. In another aspect, a new link level/IP level signaling (for example, PPP or NAS level signaling) between mobile device 305 and the access gateway 326 may be used to indicate to the access gateway 326 when to initiate mobile IP binding (or PMIP binding). Yet in another instance, the IP context setup procedure may be decoupled from the binding procedure, so that mobile device 305 would control the binding procedure and sets up PDN context(s) with the access gateway 326 without changing binding state, as explained in greater detail above.

As indicated above, to preset and maintain radio session and PDN context(s) on non-primary RAT, a single radio multimode mobile device has to tune away from the source system (e.g., LTE 310) to the target system (e.g., eHRPD 320). However, tuning away from the source system can cause missing the pages and data on the source system. To address this problem, in one aspect, new signaling may be introduced in source system, i.e., primary RAT, to indicate that mobile device is tuning away to non-primary-RAT to perform registration maintenance on that RAT. For example, in LTE technology, Extended-Service-Request message may be extended to indicate to the LTE network that the mobile device is tuning away for registration maintenance on the target system.

In order to optimize resources on the target system, a context that is preset on non-primary RAT and not used for certain period of time may be deleted. To address this need, in one aspect, a registration expiration timer may be used for each of the non-primary RAT(s) to terminate preset registration(s) in the target system(s). For each RAT, a timer may be set by the mobile device through signaling between the mobile device and that RAT system. For example in the case of eHRPD network 320, air interface and A11 signaling, vendor specific protocol (VSP), or resource reservation protocol (RSVP) messages can be extended to negotiate the value of the registration expiration timer. Both mobile device and non-primary RAT access gateway (e.g., HSGW 326) may restart the timer each time the mobile device connects to that network. The mobile device may maintain multiple timers, one for each non-primary RAT. In one aspect, before expiration of the timer on the target system, mobile device may tune to the target system and reset system's registration timer to prevent its expiration and loss of registration information.

For a mobile device that is on a primary RAT (e.g., LTE 310), and has pre-established a session with non-primary RAT (e.g., eHRPD 320), the QoS needs to be kept up-to-date on each of the non-primary RAT(s). For example, when a QoS is updated on primary LTE RAT 310, its PCRF (Policy and Charging Rule Function) will typically push the QoS update information by means of context transfer protocol over S103 tunnel to the BBERF (Bearer Binding and Event Reporting Function) on non-primary eHPPD RAN 320. However, the mobile device may not be connected to eHRPD at the time of this QoS update and HSGW 326 will not know what to do with the received QoS information. To address this problem, in one aspect, PCRF may be configured to cache the QoS information instead of automatically pushing it to gateway 326, and forward it to access gateway 326 when mobile device notifies RAT 310 that it tunes away to perform non-primary RAT maintenance. In another aspect, gateway 316 may cache the QoS information and forward it to mobile device when IP binding is performed during handoff to the target system. Yet in another aspect, PDN gateway 330 may cache the QoS information and forward it to the target access gateway 326 using binding acknowledgement message when IP binding is performed with the target system.

In one aspect, a non-primary RAT may be configured to keep a full PDN context, a partial PDN context or no PDN context at all. A full PDN context may include, but is not limited to, PPP session parameters, AAA parameters, QoS reservation parameters, mobile IP binding state parameters, data link session parameters and other types of information used for transmission of data traffic to/from mobile device 305 over packet data network, such as the Internet. A partial PDN context includes fewer than all of the parameters stored in the full PDN context. To that end, the information on whether target access network gateway (e.g., HSGW 326) supports full PDN context or not should be explicitly signaled. For example, new signaling information may be exchanged between mobile device 305 and HSGW 326 to indicate what type of context is maintained: full context, partial context, or no context. The information may be communicated at the time of handoff using for example VSNCP (Vendor-Specific Network Control Protocol). In one aspect, when mobile device 305 attempts to handoff to non-primary RAT (e.g., eHRPD RAN 320), mobile device may inquire and the network may respond using new signaling mechanism, whether it has a full PDN context has been preset on the network or not. If full context has been preset, the mobile device and network may use the context that is already established. If partial context is available, for example, IP binding state information is missing; access gateway HSGW 326 may obtain the missing information from SGW 316 of the primary RAT 310 or from PDN gateway 330. If no PDN context has been preset on the non-primary RAT, the radio access system would continue with the new context creation that would be used for the current session.

Figure 4:
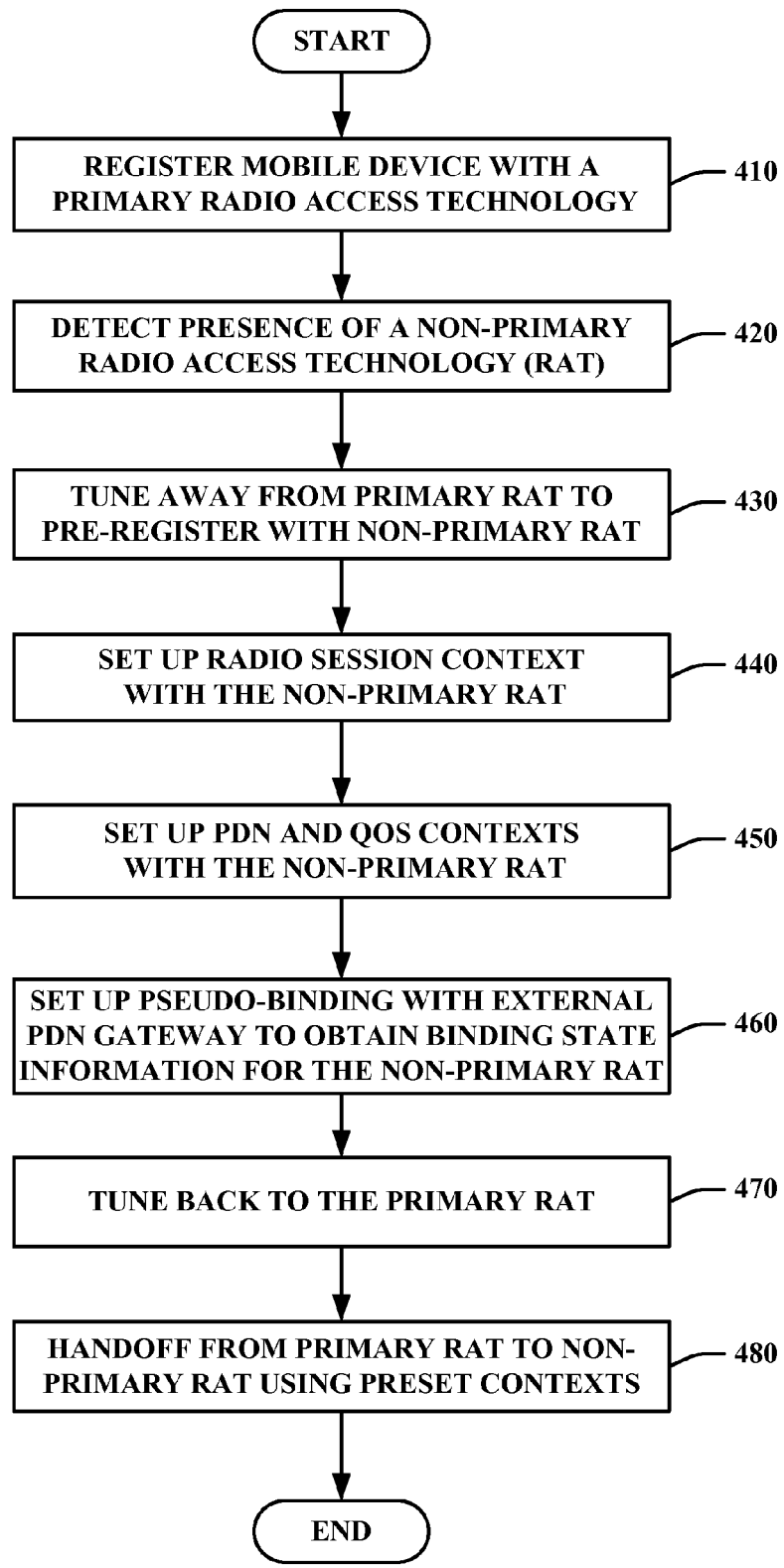
FIG. 4 is an illustration of an example methodology for multiple registrations across different radio access technologies in accordance with one aspect.

FIG. 4 illustrates one aspect of the methodology for pre-registration with a non-primary RAT. At step 410, multimode mobile device registers and attaches to a primary RAT. At step 420, mobile device detects presence of a non-primary RAT. The primary RAT and non-primary RAT have different radio access technologies supported by the multimode mobile device. At step 430, mobile device tunes away from the primary RAT to pre-register with non-primary RAT. At step 440, mobile device sets up radio session context with the non-primary RAT. At step 450, mobile device sets up a full or partial PDN context with the non-primary RAT. At step 460, mobile device sets up a pseudo-binding with external PDN gateway to obtain binding state information without transferring binding state from primary RAT to non-primary RAT. The obtained binding state information may be cached in the PDN context of the non-primary RAT. At step 470, mobile device tunes back to the primary RAT. At step 480, mobile device handoffs from primary RAT to non-primary RAT using preset radio session and creates binding with the PDN gateway using the cached PDN context.

Figure 5:
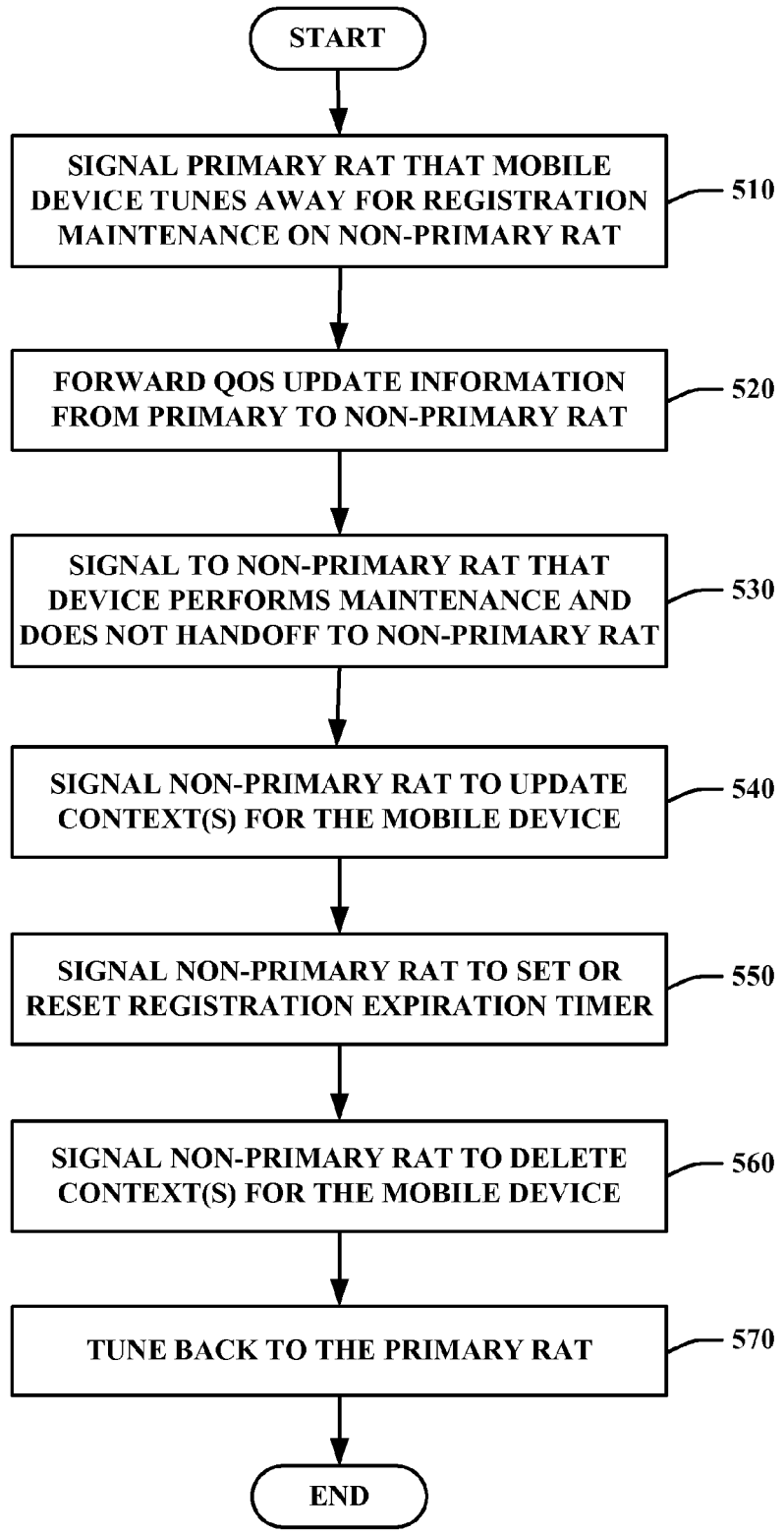
FIG. 5 is an illustration of an example methodology for registration maintenance across different radio access technologies in accordance with another aspect.

FIG. 5 illustrates one aspect of the methodology for maintenance of preset registration(s) with non-primary RAT(s). At step 510, mobile device signals the primary RAT that it will tune away for maintenance of registration(s) with non-primary RAT(s). At step 520, primary RAT may be configured, in response to the tune-away signal, for example, to forward to the non-primary RAT quality of service (QoS) update information for the current communication sessions with the mobile device. At step 530, mobile device signals to a non-primary RAT that it intends to perform registration maintenance and does not handoff to non-primary RAT. At step 540, mobile device may signal to the non-primary RAT to update radio session context and PDN context associated with the mobile device using, for example, QoS update information provided by the primary RAT in step 520. At step 550, mobile device may also signal to the non-primary RAT to set or reset its registration expiration timer(s). Alternatively, at step 560, mobile device may signal to the non-primary RAT to delete some or all context(s) associated with the mobile device. At step 570, mobile device tunes back to the primary RAT.

Figure 6:
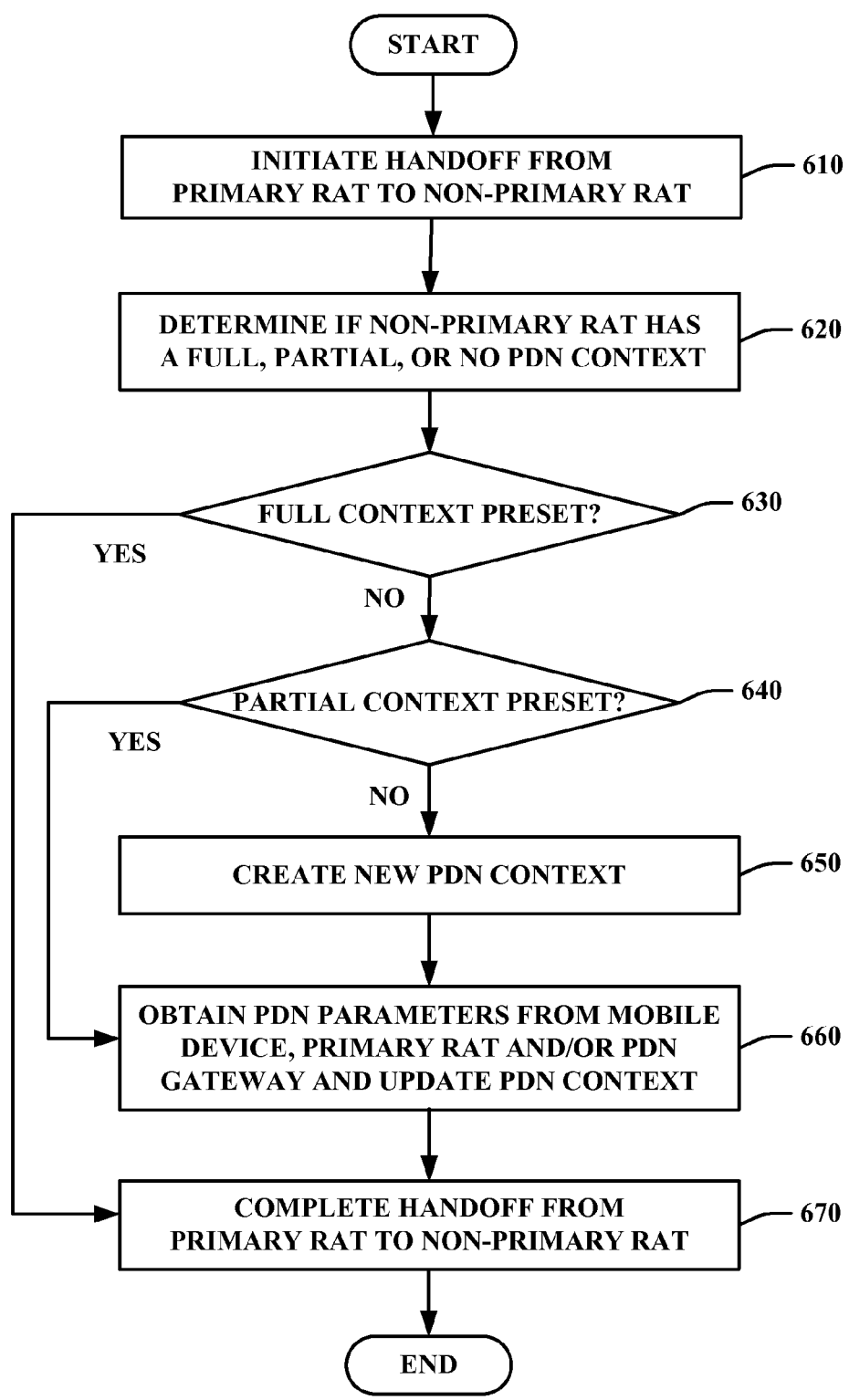
FIG. 6 is an illustration of an example methodology for handoff across different radio access technologies in accordance with yet another aspect.

FIG. 6 illustrates another aspect of the methodology for handoff from primary RAT to non-primary RAT. At step 610, mobile device initiates handoff form primary RAT to non-primary RAT. At step 620, mobile device determines if a full PDN context, partial PDN context or no PDN context has been preset on the non-primary RAT. If, at step 630, mobile device determines that a full PDN context is preset on the non-primary RAT, at step 670, mobile device may complete handoff from primary RAT to non-primary RAT using preset PDN context. If, at step 640, mobile device determines that a partial PDN context has been preset on the non-primary RAT, the access system may obtain, at step 660, the required PDN parameters from the mobile device, primary RAT or external PDN gateway, and update PDN context to its full state. If, at step 640, it is determined that no PDF context has been preset on the non-primary RAT, target system may create new PDN context at step 650, fill it with parameters obtained form the mobile device, primary RAT and external PDN gateway. At step 670, mobile device completes handoff form the primary RAT to the non-primary RAT using the complete PDN context.

Figure 7:
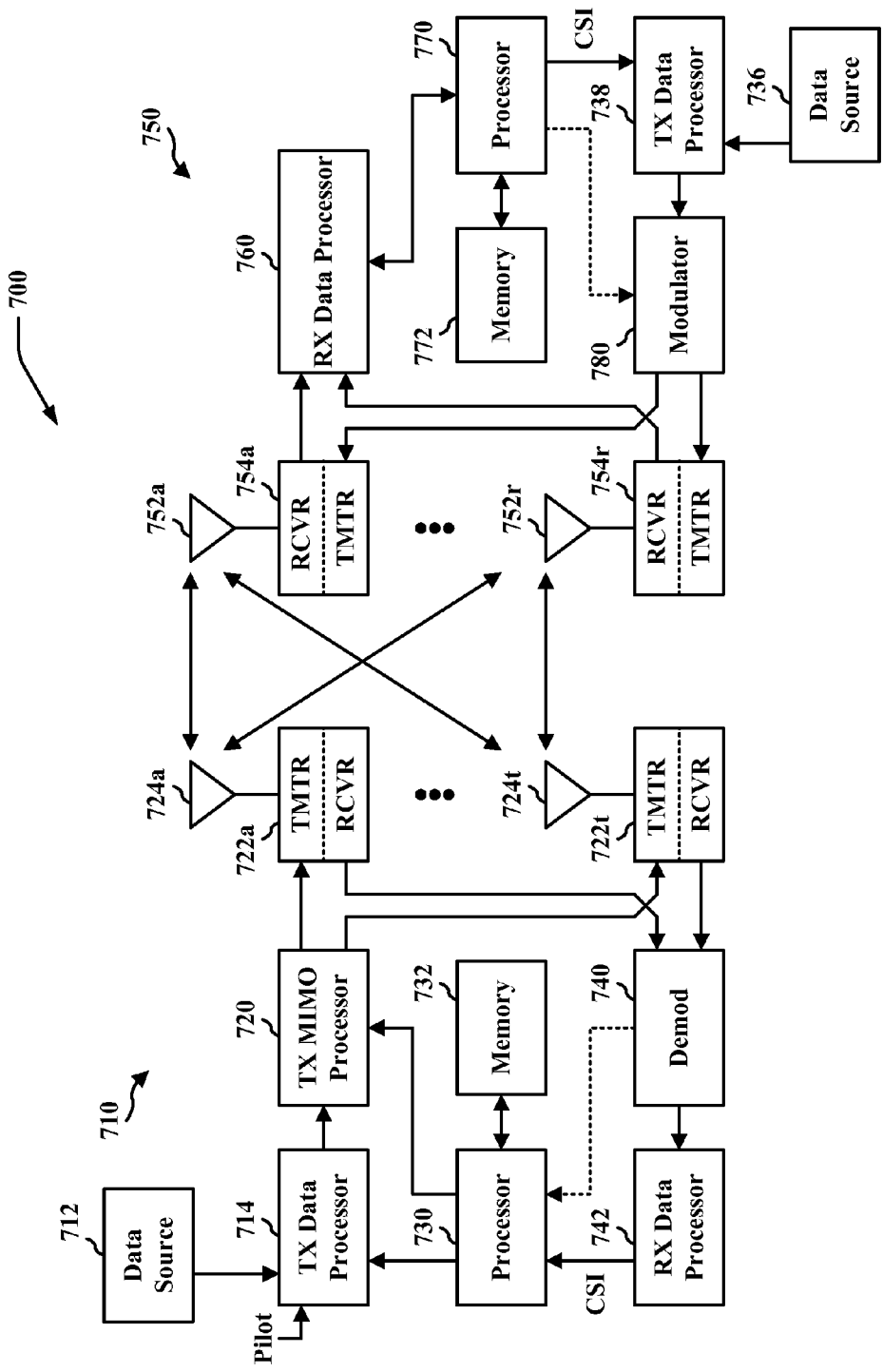
FIG. 7 is an illustration of an example wireless communication system.

FIG. 7 shows one non-limiting example of a wireless communication system 700 in which various aspects of the methodologies described herein may be implemented. The system 700 depicts one base station/forward link transmitter 710 in a radio access network and one mobile device 750 for sake of brevity. However, it is to be appreciated that system 700 can include more than one base station/forward link transmitter and/or more than one mobile device, wherein additional base stations/transmitters and/or mobile devices can be substantially similar or different from example base station/forward link transmitters 710 and mobile device 750 described below. In addition, it is to be appreciated that base station/forward link transmitter 710 and/or mobile device 750 can employ the systems (FIGS. 1-3 and 8-9) and/or methods (FIGS. 4-6) described herein to facilitate multiple registrations across different access technologies.

At base station/forward link transmitter 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 720, which can further process the modulation symbols (e.g., for OFDM). TX MIMO processor 720 then provides NT modulation symbol streams to NT transmitters (TMTR) 722a through 722t. In various aspects, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 722a through 722t are transmitted from NT antennas 724a through 724t, respectively.

At mobile device 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the NR received symbol streams from NR receivers 754 based on a particular receiver processing technique to provide NT "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station/forward link transmitter 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station/forward link transmitter 710.

At base station/forward link transmitter 710, the modulated signals from mobile device 750 can be received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights. It is to be appreciated that in the case of a forward link transmitter 710, as opposed to a base station, these RX components may not be present since data is only broadcasted over the forward link.

Processors 730 and 770 can direct (e.g., control, coordinate, manage, etc.) operation at base station/forward link transmitter 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

Figure 8:
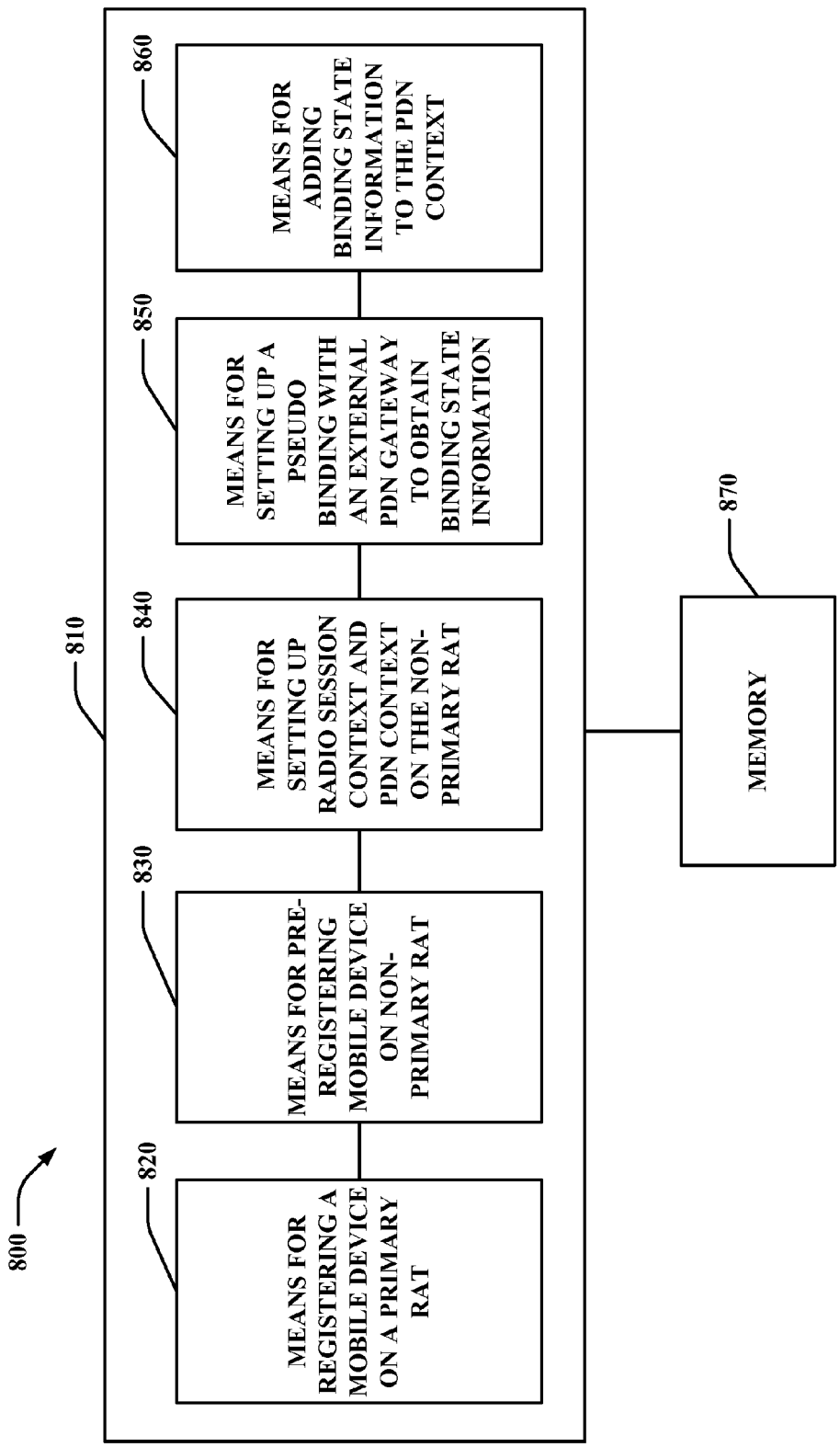
FIG. 8 is an illustration of an example system for performing multiple registrations across different radio access technologies in accordance with one aspect.

Turning to FIG. 8, illustrated is a system 800 for performing multiple registrations across different radio access technologies in accordance with one aspect. System 800 can reside within a multimode mobile device. As depicted, system 800 includes functional blocks that can represent functions implemented by a processor, software, or combination thereof (e.g., firmware). System 800 includes a logical grouping 810 of electrical components that facilitate multiple registrations of a multimode mobile device across different radio access technologies. Logical grouping 810 can include means 820 for registering the mobile device on a primary RAT. Moreover, logical grouping 810 can include means 830 for pre-registering the mobile device with one or more non-primary RATs. The primary RAT and non-primary RAT(s) having different technologies. Furthermore, logical grouping 810 can include means 840 for setting up radio session context and PDN context on the non-primary RAT(s). In addition, logical grouping 810 can include means 850 for setting up a pseudo-binding with an external PDN gateway to obtain binding state information associated with the mobile device. Lastly, logical grouping 810 can include means 860 for adding binding state information to the PDN context. Moreover, logical grouping 810 can include means (not shown) for performing handoff between primary and non-primary RATs. Additionally, system 800 can include a memory 870 that retains instructions for executing functions associated with electrical components 820 to 860. While shown as being external to memory 870, it is to be understood that electrical components 820 to 860 can exist within memory 870.

Figure 9:
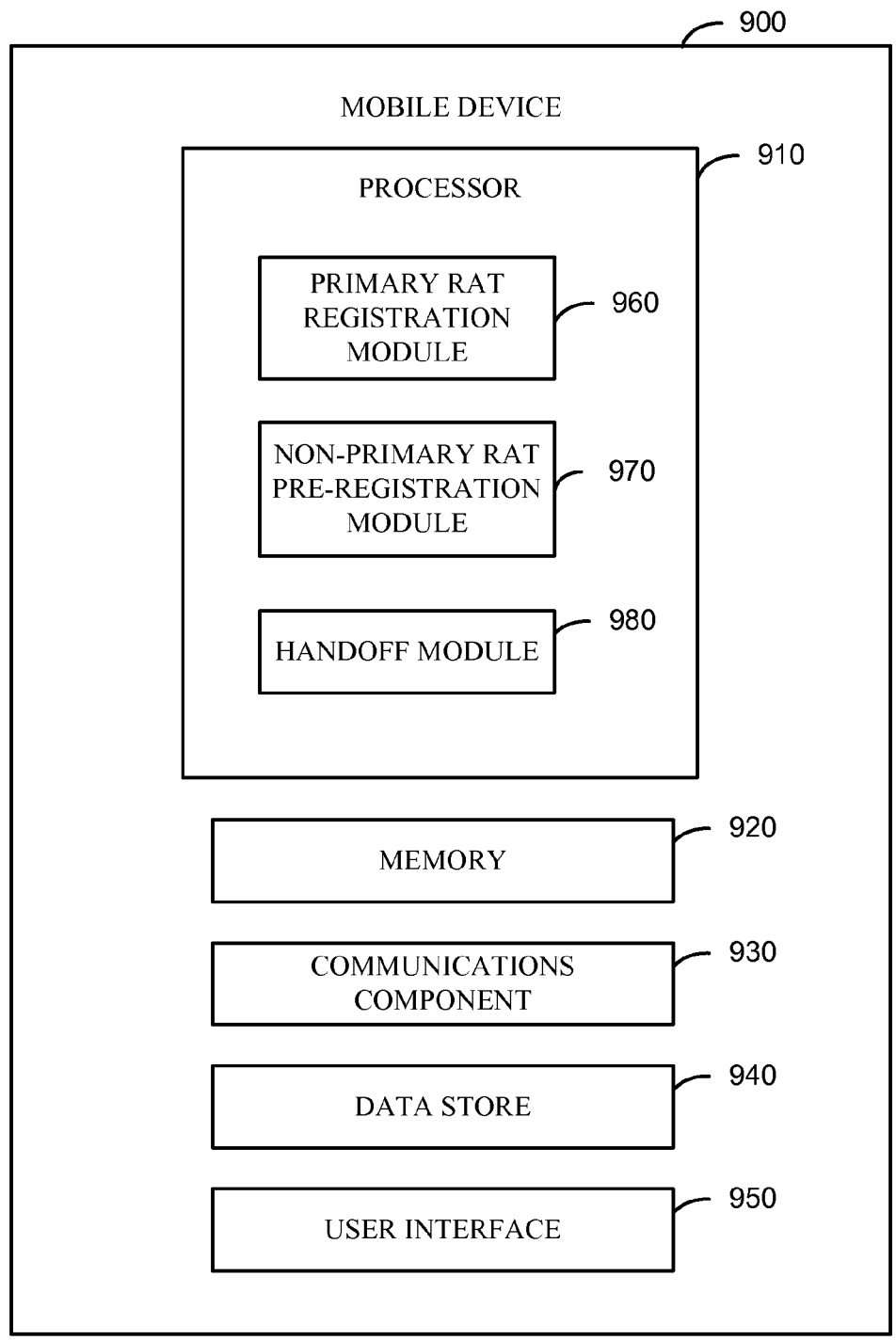
FIG. 9 is an illustration of an example mobile device operable to perform multiple registrations across different radio access technologies in accordance with one aspect set.

FIG. 9 illustrates an example multimode mobile device 900 operable to perform multiple registrations across different radio access technologies in accordance with methodologies disclosed herein. Mobile device 900 includes a processor 910 for carrying out processing functions associated with one or more of components and functions described herein. Processor 910 can include a single or multiple set of processors or multi-core processors. Mobile device 900 further includes a memory 920 coupled to processor 910, such as for storing local versions of applications being executed by processor 910. Memory 920 can include any type of memory usable by a computer, such as random access memory (RAM), read only memory (ROM), magnetic discs, optical discs, volatile memory, non-volatile memory, and any combination thereof.

Further, mobile device 900 includes one or more communications components 930, such as radio transceiver(s), coupled to processor 910 for establishing and maintaining communications with one or more radio access networks utilizing hardware, software, and services as described herein. For example, communications component 930 may include transmit chain components and receive chain components associated with a transmitter and receiver, respectively, operable for interfacing with external radio networks and devices. Additionally, mobile device 900 may further include a data store 940 coupled to processor 910, which can be any suitable combination of hardware and/or software, that provides for mass storage of information, databases, and programs employed in connection with aspects described herein. For example, data store 940 may be a data repository for applications not currently being executed by processor 910.

Mobile device 900 may include a user interface component 950 coupled to processor 910 and being operable to receive inputs from a user of mobile device 900 and further operable to generate outputs for presentation to the user. User interface component 950 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 950 may include one or more output devices, including but not limited to a display, a speaker, a haptic feedback mechanism, a printer, any other mechanism capable of presenting an output to a user, or any combination thereof.

In one example aspect, processor 910 includes a primary RAT registration module 960 for instructing communications component 930 to perform registration and attachment of the mobile device 900 to the primary RAT. Processor 910 may also include a non-primary RAT pre-registration module 970 for instructing communications component 930 to perform pre-registration and context setup on one or more non-primary RATs, which are different from the primary RAT. Processor 910 may further include a handoff module 980 for instructing communications component 930 to handoff communication with the mobile device from the primary RAT to the non-primary RAT. Processor 910 may include other modules for performing multiple registrations across different access technologies in accordance with methodologies disclosed herein.

As used in this disclosure, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet or other types of packet-switched networks with other systems by way of the signal.

Moreover, various aspects or features of methodologies for inter-technology registration and handoff across different radio access networks described herein can be implemented as a method, apparatus, or article of manufacture using standard programming and/or engineering techniques. The term "article of manufacture" as used herein is intended to encompass a computer program accessible from any non-transient computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other non-transient machine-readable media for storing information. The term "machine-readable medium" can include, without being limited to, wireless channels and various other media capable of storing or containing instructions and/or data.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing multiple registrations across different radio access technologies (RATs) by a multimode mobile device, the method comprising:
   registering the mobile device with a primary RAT; and
   pre-registering the mobile device with at least one non-primary RAT different from the primary RAT, wherein the pre-registration includes:
      setting up a radio session context with the non-primary RAT using non-primary RAT air interface;
      setting up a packet data network (PDN) context with the non-primary RAT;
      setting up a pseudo-binding with an external PDN gateway and obtaining a binding state information for the mobile device from the PDN gateway without transferring binding state from the primary RAT to the non-primary RAT; and
      adding the obtained binding state information to the PDN context; and
      determining whether a full PDN context or partial PDN context is preset on the non-primary RAT;
      when a full PDN context is preset on the non-primary RAT, performing handoff from primary RAT to non-primary RAT using preset PDN context; and
      when a partial PDN context is preset on the non-primary RAT, (i) completing the PDN context with the missing parameters obtained from the mobile device, primary RAT or external PDN gateway, and (ii) performing handoff from primary RAT to non-primary RAT using the completed PDN context.

2. The method of claim 1, further comprising performing handoff of the mobile device from the primary RAT to the non-primary RAT using preset radio session context and PDN context on the non-primary RAT.

3. The method of claim 1, further comprising performing registration maintenance on the non-primary RAT without triggering a binding with the non-primary RAT, wherein registration maintenance includes a periodic keep-alive mechanism between non-primary RAT and the mobile device and mobility based pre-registration by the mobile device with the non-primary RAT.

4. The method of claim 3, further comprising signaling the primary RAT to forward to the non-primary RAT quality of service (QoS) update information for the current communication session with the mobile device, wherein the QoS update information is cached on the primary RAT and transmitted to the non-primary RAT only when the mobile device triggers binding with the non-primary RAT.

5. The method of claim 3, further comprising signaling to the non-primary RAT that mobile device intends to perform pre-registration context setup or pre-registration context maintenance with the non-primary RAT and do not handoff to the non-primary RAT.

6. The method of claim 4, further comprising signaling the non-primary RAT to update the radio session context and the PDN context without triggering a binding with non-primary RAT.

7. The method of claim 3, further comprising signaling to the non-primary RAT to negotiate, set or reset a registration expiration timer.

8. The method of claim 1, further comprising determining whether no PDN context is preset on the non-primary RAT.

9. The method of claim 8, wherein
   when no PDN context is preset on the non-primary RAT, (i) creating a new PDN context, (ii) obtaining required context parameters from the mobile device, primary RAT or external PDN gateway, and (iii) performing handoff from primary RAT to non-primary RAT using the created PDN context.

10. A wireless communication system, comprising:
   a processor and a communications component coupled to the processor, the processor being configured to:
   register a multimode mobile device with a primary RAT using the communications component; and
   pre-register the mobile device with at least one non-primary RAT using the communications component, the non-primary RAT being different from the primary RAT, wherein the processor being further configured to:
      set up a radio session context with the non-primary RAT using the communications component;
      set up a packet data network (PDN) context with the non-primary RAT using the communications component;
      set up a pseudo-binding with an external PDN gateway using the communications component and obtain a binding state information for the mobile device from the PDN gateway without transferring binding state from the primary RAT to the non-primary RAT; and add the obtained binding state information to the PDN context using the communications component;

determine whether a full PDN context or partial PDN context is preset on the non-primary RAT;

when a full PDN context is preset on the non-primary RAT, perform handoff from primary RAT to non-primary RAT using preset PDN context; and when a partial PDN context is preset on the non-primary RAT, (i) complete the PDN context with the missing parameters obtained from the mobile device, primary RAT or external PDN gateway, and (ii) perform handoff from primary RAT to non-primary RAT using the completed PDN context.

11. The system of claim 10, the processor being further configured to perform using the communications component handoff from the primary RAT to the non-primary RAT using preset radio session context and PDN context on the non-primary RAT.

12. The system of claim 10, the processor being further configured to perform registration maintenance on the non-primary RAT using the communications component, wherein registration maintenance includes a periodic keep-alive mechanism between non-primary RAT and the mobile device and mobility based pre-registration by the mobile device with the non-primary RAT.

13. The system of claim 12, the processor being further configured to signal using the communications component the primary RAT to forward to the non-primary RAT quality of service (QoS) update information for the current communication session with the mobile device, wherein the QoS update information is cached on the primary RAT and transmitted to the non-primary RAT only when the mobile device triggers binding with the non-primary RAT.

14. The system of claim 12, the processor being further configured to signal using the communications component to the non-primary RAT that mobile device intends to perform registration maintenance on the non-primary RAT and do not handoff to the non-primary RAT.

15. The system of claim 13, the processor being further configured to signal using the communications component to the non-primary RAT to update the radio session context and the PDN context using QoS update information provided by the primary RAT.

16. The system of claim 12, the processor being further configured to signal using the communications component to the non-primary RAT to set or reset a registration expiration timer.

17. The system of claim 12, the processor being further configured to determine whether no PDN context is preset on the non-primary RAT.

18. The system of claim 17, wherein when no PDN context is preset on the non-primary RAT, the processor being further configured to (i) create a new PDN context, (ii) obtain required context parameters from the mobile device, primary RAT or external PDN gateway, and (iii) perform handoff from primary RAT to non-primary RAT using the created PDN context.

19. A computer program product for performing multiple registrations across different radio access technologies (RAT) by a multimode mobile device, comprising:

a non-transitory computer-readable medium comprising:

a first set of codes for registering a mobile device with a primary RAT; and a second set of codes for pre-registering the mobile device with at least one non-primary RAT different from the primary RAT, wherein the second set of codes includes:

a third set of codes for setting up a radio session context with the non-primary RAT;

a fourth set of codes for setting up a packet data network (PDN) context with the non-primary RAT;

a fifth set of codes for setting up a pseudo-binding with an external PDN gateway and obtaining a binding state information for the mobile device from the PDN gateway without transferring binding state from the primary RAT to the non-primary RAT; and a sixth set of codes for adding the obtained binding state information to the PDN context;

a seventh set of codes for determining whether a full PDN context or partial PDN context is preset on the non-primary RAT;

when a full PDN context is preset on the non-primary RAT, a eight set of codes for performing handoff from primary RAT to non-primary RAT using preset PDN context; and when a partial PDN context is preset on the non-primary RAT, a ninth set of codes for (i) completing the PDN context with the missing parameters obtained from the mobile device, primary RAT or external PDN gateway, and (ii) performing handoff from primary RAT to non-primary RAT using the completed PDN context.

20. The product of claim 19, further comprising a tenth set of codes for performing handoff of the mobile device from the primary RAT to the non-primary RAT using preset radio session context and PDN context on the non-primary RAT.

21. The product of claim 19, further comprising an eleventh set of codes for performing registration maintenance on the non-primary RAT, including a twelfth set of codes for updating the session context and the PDN context of the non-primary RAT.

22. The product of claim 21, further comprising a thirteenth set of codes for signaling to the non-primary RAT to set or reset a registration expiration timer.

23. The product of claim 21, further comprising a fourteenth set of codes for determining whether no PDN context is preset on the non-primary RAT.

24. An apparatus for performing multiple registrations across different radio access technologies (RAT) by a multimode mobile device, comprising:

means for registering the mobile device with a primary RAT; and means for pre-registering the mobile device with at least one non-primary RAT different from the primary RAT, wherein the means for pre-registering includes:

means for setting up a radio session context with the non-primary RAT;

means for setting up a packet data network (PDN) context with the non-primary RAT;

means for setting up a pseudo-binding with an external PDN gateway and obtaining a binding state information for the mobile device from the PDN gateway without transferring binding state from the primary RAT to the non-primary RAT; and means for adding the obtained binding state information to the PDN context;

means for determining whether a full PDN context or partial PDN context is preset on the non-primary RAT;

when a full PDN context is preset on the non-primary RAT, means for performing handoff from primary RAT to non-primary RAT using preset PDN context; and when a partial PDN context is preset on the non-primary RAT, means for (i) completing the PDN context with the missing parameters obtained from the mobile device, primary RAT or external PDN gateway, and (ii) performing handoff from primary RAT to non-primary RAT using the completed PDN context.

25. The apparatus of claim 24, further comprising means for performing handoff of the mobile device from the primary RAT to the non-primary RAT using preset radio session context and PDN context on the non-primary RAT.

26. The apparatus of claim 24, further comprising means for performing registration maintenance on the non-primary RAT, including means for updating the session context and the PDN context of the non-primary RAT.

27. The apparatus of claim 26, further comprising means for signaling to the non-primary RAT to set or reset a registration expiration timer.

28. The apparatus of claim 26, further comprising means for determining whether no PDN context is preset on the non-primary RAT.

* * * * *